(12) United States Patent
Degand et al.

(10) Patent No.: US 11,351,873 B2
(45) Date of Patent: Jun. 7, 2022

(54) DRIVING ASSISTANCE METHOD FOR ASSISTANCE OF A POWER-INTENSIVE DRIVING MANOEUVER OF A SUBJECT VEHICLE, AND DRIVING ASSISTANCE SYSTEM FOR A POWER-INTENSIVE DRIVING MANOEUVER OF A SUBJECT VEHICLE

(71) Applicant: Bayerische Motoren Werke Aktiengesellschaft, Munich (DE)

(72) Inventors: Christoph Degand, Munich (DE); Pablo Fritzsche, Herrsching (DE); Alexander Kowallik, Munich (DE); Boris Zuev, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 156 days.

(21) Appl. No.: 16/601,312

(22) Filed: Oct. 14, 2019

(65) Prior Publication Data

US 2020/0039363 A1 Feb. 6, 2020

Related U.S. Application Data

(63) Continuation of application No. PCT/EP2018/059145, filed on Apr. 10, 2018.

(30) Foreign Application Priority Data

Apr. 20, 2017 (DE) ..................... 10 2017 206 695.4

(51) Int. Cl.
*B60L 15/20* (2006.01)
*B60L 58/12* (2019.01)
(Continued)

(52) U.S. Cl.
CPC ............. *B60L 15/209* (2013.01); *B60L 58/12* (2019.02); *B60W 30/18163* (2013.01);
(Continued)

(58) Field of Classification Search
CPC ..................................................... B60L 15/209
See application file for complete search history.

(56) References Cited

U.S. PATENT DOCUMENTS 2,078,362 A * 4/1937 Arendt ...................... H02P 9/00
290/30 R
5,343,970 A * 9/1994 Severinsky ........... B60W 10/26
475/5
(Continued)

FOREIGN PATENT DOCUMENTS

DE       40 05 444 A1      8/1991
DE       10035027 A1 *     7/2000
(Continued)

OTHER PUBLICATIONS

Google Machine Translation of German Patent Pub. No. DE 10 2013 218 127 A1 to Grewe et al. that was filed in 2013 (hereinafter "Grewe").*
(Continued)

*Primary Examiner* — Jean Paul Cass
(74) *Attorney, Agent, or Firm* — Crowell & Moring LLP (57) ABSTRACT

A driving assistance method for assisting a power-intensive driving maneuver of a subject vehicle includes predicting the power-intensive driving maneuver of the subject vehicle, and determining whether driving maneuver criteria, which comprise at least one energy criterion and at least one traffic criterion, are satisfied for the predicted power-intensive driving maneuver. Determining if the at least one energy criterion is satisfied includes determining a peak power profile required for a full execution of the predicted power-
(Continued)

intensive driving maneuver, determining an available drive power of the subject vehicle, and evaluating whether the available drive power is sufficient for the peak power profile, wherein the at least one energy criterion is satisfied if the available drive power is sufficient for the peak power profile. Determining if the at least one traffic criterion is satisfied includes detecting a traffic situation, which comprises at least one traffic condition and/or a route topology, in the surroundings of the subject vehicle, and evaluating whether the predicted power-intensive driving maneuver can be fully executed in the detected traffic situation, wherein the traffic criterion is satisfied if the predicted driving maneuver can be fully executed in detected traffic situation. The method further includes displaying a result of determining whether the driving maneuver criteria are satisfied for the predicted power-intensive driving maneuver.

13 Claims, 4 Drawing Sheets

(51) Int. Cl.
*B60W 30/18* (2012.01)
*B60W 50/00* (2006.01)
*B60W 50/14* (2020.01)

(52) U.S. Cl.
CPC ........ *B60W 50/0097* (2013.01); *B60W 50/14* (2013.01); *B60L 2240/64* (2013.01); *B60L 2240/68* (2013.01); *B60L 2250/16* (2013.01); *B60L 2260/54* (2013.01); *B60W 2050/146* (2013.01); *B60W 2510/085* (2013.01); *B60W 2510/244* (2013.01); *B60W 2552/00* (2020.02); *B60W 2554/80* (2020.02); *B60W 2554/804* (2020.02)

(56) References Cited

U.S. PATENT DOCUMENTS

| | | | | |
|---|---|---|---|---|
| 5,533,583 | A * | 7/1996 | Adler | F02D 31/007 180/65.245 |
| 5,568,052 | A | 10/1996 | Sway-Tin et al. | |
| 7,960,928 | B2 * | 6/2011 | Tang | B60L 15/2045 318/400.09 |
| 9,483,947 | B2 | 11/2016 | Strassberger | |
| 9,493,071 | B2 | 11/2016 | Lindhuber et al. | |
| 10,500,975 | B1 * | 12/2019 | Healy | B60L 15/2027 |
| 10,814,860 | B1 * | 10/2020 | Gaither | B60W 20/40 |
| 2005/0240319 | A1 * | 10/2005 | Sawada | B60W 50/10 701/1 |
| 2009/0242301 | A1 * | 10/2009 | McClanahan | B60K 5/08 180/69.6 |
| 2010/0131139 | A1 * | 5/2010 | Sakai | B60K 6/46 903/903 |
| 2011/0288712 | A1 * | 11/2011 | Wang | B60W 10/06 180/65.265 |
| 2012/0191279 | A1 | 7/2012 | Wippler | |
| 2013/0073113 | A1 * | 3/2013 | Wang | B60W 20/11 701/1 |
| 2013/0103238 | A1 * | 4/2013 | Yu | B60W 30/18072 903/930 |
| 2014/0163789 | A1 * | 6/2014 | Yu | B60W 20/00 903/930 |
| 2015/0134206 | A1 * | 5/2015 | Matsunaga | B60W 10/06 701/123 |
| 2015/0377158 | A1 * | 12/2015 | Benjey | B60W 20/13 903/905 |
| 2016/0257295 | A1 * | 9/2016 | Miller | B60W 50/0097 |
| 2018/0023692 | A1 * | 1/2018 | Gauthier | F16H 61/0213 701/55 |
| 2018/0093655 | A1 * | 4/2018 | Healy | B60K 6/448 |
| 2018/0120119 | A1 * | 5/2018 | Payne | B60W 20/12 |
| 2018/0120841 | A1 * | 5/2018 | Endo | B60W 20/00 |
| 2018/0236994 | A1 * | 8/2018 | Healy | B60W 10/30 |
| 2018/0339694 | A1 * | 11/2018 | Zhang | B60W 20/00 |
| 2019/0039595 | A1 * | 2/2019 | Hawley | B60L 15/2018 |
| 2019/0071067 | A1 * | 3/2019 | Leone | F02N 11/0837 |
| 2019/0143821 | A1 * | 5/2019 | Bell | B60W 10/08 180/65.225 |
| 2020/0039499 | A1 * | 2/2020 | Passman | B60W 10/06 |
| 2020/0094695 | A1 * | 3/2020 | Bowman | B60K 6/547 |
| 2020/0165987 | A1 * | 5/2020 | Cunningham | B60W 20/00 |
| 2021/0070315 | A1 * | 3/2021 | Thompson | B60W 50/10 |

FOREIGN PATENT DOCUMENTS

| | | | |
|---|---|---|---|
| DE | 100 35 027 | A1 | 1/2002 |
| DE | 695 29 841 | T2 | 11/2003 |
| DE | 10 2007 054 453 | A1 | 5/2009 |
| DE | 102010010 443 | * | 2/2010 |
| DE | 10 2010 010 443 | A1 | 8/2011 |
| DE | 10 2010 041 544 | A1 | 3/2012 |
| DE | 102013218127 | * | 9/2013 |
| DE | 10 2013 217 434 | A1 | 3/2015 |
| DE | 10 2013 218 127 | A1 | 3/2015 |
| DE | 10 2014 211 530 | A1 | 12/2015 |
| ER | 0 443 185 | A2 | 8/1991 |
| ER | 2 535 221 | A1 | 12/2012 |

OTHER PUBLICATIONS

Google Machine Translation of German Patent Pub. No. DE 100 35 027 A1 to Antony et al. that was filed in 2000.*
Google Machine Translation of German Patent Pub. No. DE 10 2010 010 443 A1 to Albrecht et al. that was filed in 2010.*
PCT/EP2018/059145, International Search Report dated Jul. 6, 2018 (Three (3) pages).
German Search Report issued in German counterpart application No. 10 2017 206 695.4 dated Dec. 7, 2017, with Statement of Relevancy (Five (5) pages).
"Annual Report 2011/2012, Report A 36, Federal Highway Research Institute", bast, 153 total pages, 2013.

* cited by examiner

DRIVING ASSISTANCE METHOD FOR ASSISTANCE OF A POWER-INTENSIVE DRIVING MANOEUVER OF A SUBJECT VEHICLE, AND DRIVING ASSISTANCE SYSTEM FOR A POWER-INTENSIVE DRIVING MANOEUVER OF A SUBJECT VEHICLE

CROSS REFERENCE TO RELATED APPLICATIONS

This application is a continuation of PCT International Application No. PCT/EP2018/059145, filed Apr. 10, 2018, which claims priority under 35 U.S.C. § 119 from German Patent Application No. 10 2017 206 695.4, filed Apr. 20, 2017, the entire disclosures of which are herein expressly incorporated by reference.

BACKGROUND AND SUMMARY OF THE INVENTION

The invention relates to a driving assistance method for assisting a power-intensive driving maneuver of a subject vehicle and a driving assistance system for a power-intensive driving maneuver of a subject vehicle.

The prior art has already disclosed driving maneuver assistants such as an overtaking assistant, which is described, for example, in DE 102014211530 A1 or DE 102013217434 A1, or a lane change assistant, which is described, for example, in DE 4005444 A1. Furthermore, a driver assistance system is known which assists the driver during consumption-controlled driving as described, for example, in DE 102010041544 A1.

However, the assistance systems which are known from the prior art do not provide the driver with any help in assessing whether the planned power-intensive driving maneuver can be safely executed as a function of the current traffic situation and whether at the same time sufficient drive power of the vehicle is available for the planned power-intensive driving maneuver. Particularly in the case of electrically operated vehicles this aspect is essential because an insufficient energy supply usually results in a restriction of the drive power and therefore a safety risk. In the case of power-intensive driving maneuvers of the electrically operated vehicles it is, however, important to ensure safe execution with sufficient drive power over the entire duration of the power-intensive driving maneuver.

An object of the invention is therefore to make available a driving assistance method and a driving assistance system for assisting a power-intensive driving maneuver of a subject vehicle which provide information about the safety of the driving maneuver and the availability of drive power over the duration of the power-intensive driving maneuver.

The object is achieved by the features of the independent patent claims. Advantageous embodiments are described in the dependent claims. It is to be noted that additional features of a patent claim which is dependent on an independent patent claim can form a separate invention, which is independent of the combination of all the features of the independent patent claim and which can be made the subject matter of an independent claim, of a partial application or of a subsequent application, without the features of the independent patent claim or only in combination with a subset of the features of the independent patent claim. This applies in the same way to examples of technical teaching which are described in the description and which can form an invention which is independent of the features of the independent patent claims.

A first aspect of the invention relates to a driving assistance method for assisting a power-intensive driving maneuver of a subject vehicle which is powered by an electric motor fed by an energy store, wherein the driving assistance method comprises:

predicting a power-intensive driving maneuver of the subject vehicle;

determining whether driving maneuver criteria, which comprise at least one energy criterion and one traffic criterion, are satisfied for the predicted driving maneuver, wherein the determination of the satisfaction of the energy criterion comprises:

determining a peak power profile which is required for the full execution of the predicted driving maneuver;

determining the available drive power of the subject vehicle;

evaluating whether the available drive power is sufficient for the peak power profile, wherein the energy criterion is satisfied if the available drive power is sufficient for the peak power profile;

wherein the determination of the satisfaction of the traffic criterion comprises:

detecting a traffic situation, which comprises at least one traffic condition and/or a route topology, in the surroundings of the subject vehicle;

evaluating whether the predicted driving maneuver can be fully executed in relation to the detected traffic situation, wherein the traffic criterion is satisfied if the predicted driving maneuver can be fully executed in relation to the detected traffic situation;

displaying the result of the determination.

Within the scope of the present document, an energy store is to be understood as a system which comprises one or more energy storage units which are connected in series and/or in parallel and which each have at least two energy storage cells. A preferred example of such an energy store is an accumulator or a high-voltage battery such as are used usually in electric vehicles or hybrid vehicles.

Within the scope of these statements, a power-intensive driving maneuver of the subject vehicle is understood to be a driving maneuver in which a high drive power or the maximum drive power is necessary for a specific duration. Such a drive maneuver comprises at least one of the following operations: an overtaking operation, a lane change, an entering maneuver or exiting maneuver, for example a freeway-entering maneuver or freeway-exiting maneuver, an acceleration operation and a boost operation. The operations described above can be combined as desired in order to form a power-intensive driving maneuver. In this context, just one of these operations can also be the power-intensive driving maneuver.

A power-intensive driving maneuver of the subject vehicle can be predicted using at least one of the following data items or parameters: surroundings data which can be acquired, for example, by a surroundings detection device, pedal parameters, such as, for example, the pedal distance travelled, steering data such as, for example, information about the executed steering movement, and data of a travel direction indicator such as, for example, the activation of the flashing indicator light. The surroundings detection device is designed to detect the vehicle surroundings with the aid of a surroundings sensor system, and to make available and/or process corresponding surroundings data. The surroundings sensor system comprises at least one of the following devices: ultrasonic sensor, radar sensor, lidar sensor and/or camera. The surroundings data can originate from one of the abovementioned devices or from a combination of a plurality of the abovementioned devices (sensor data fusion). The prediction of a power-intensive driving maneuver of the subject vehicle is accordingly carried out by acquiring and evaluating surroundings data and/or pedal parameters and/or steering data and/or data of a travel direction indicator.

The power-intensive driving maneuver advantageously comprises an overtaking operation. The power-intensive driving maneuver is preferably an overtaking operation.

An overtaking operation can be detected by at least one of the following actions which can be detected by means of the data and devices specified above, such as for example the surroundings detection device:

moving of the subject vehicle up to a vehicle travelling ahead. The approaching of a vehicle travelling ahead can already be detected as a detection criterion for intention to overtake;

identifying an applicable differential speed which has to be present for the vehicle to move up;

the subject vehicle following a vehicle travelling ahead and activating a change of travel direction indicator (e.g. flashing direction indicator light);

the subject vehicle following a vehicle travelling ahead and rapid depression of the accelerator pedal; and steering movement or movements and offset following, i.e. veering out and/or offset driving, of a vehicle travelling ahead.

A peak power profile is determined for the determination of the satisfaction of the energy criterion. For this purpose, a time profile of the peak power is determined. Firstly, the time sequence and spatial sequence of the power-intensive driving maneuver is advantageously predicted (for example by means of trajectory planning). In this context, the focus is directed at the peak power which is to be called. For the prediction of the time sequence and spatial sequence of the power-intensive driving maneuver, driving dynamics data of at least one of the following are determined and evaluated: of the subject vehicle, of a vehicle travelling ahead, of a following vehicle and of an oncoming vehicle. In this context, the driving dynamics data comprise at least one of the following types of information: route profile, distance, time, speed, acceleration, distance from vehicle travelling ahead and/or following vehicle and/or oncoming vehicle, consumption of energy, heating of the motor or motors, drive forces, power, movement resistance and vehicle efficiency level.

According to the present statements, the term peak power profile comprises the profile of the maximum drive power. The maximum drive power is to be understood as the drive power which can be made available by the drive system for a brief load duration without the power of the electric drive system collapsing.

The determination of the peak power profile advantageously comprises the determination of the duration which is required for the full execution of the predicted driving maneuver, and the determination of the time profile of the maximum drive power over the predicted duration. This therefore means that the focus is directed on the maximum drive power (peak power) of the electric drive system. An electric drive system comprises at least one energy store, one energy controller (inverter) and at least one traction-adjusting assembly. Electronic drive systems are usually designed with respect to their continuous load. However, in this context a peak load of the electric drive system which is possible for a short time is disregarded. Electric drive systems can be operated with a brief peak load which is significantly above the continuous power level. Owing to high thermal and mechanical loading as well as various damage mechanisms, this peak load must, however, be present only for a limited time while the continuous load is permanently available. Therefore, the operating strategy of the electric drive system is usually selected in such a way that the available drive torque is limited as a function of the time limits which are set by the respectively available peak load or continuous load. Limiting the available drive torque can result in a reduction in the driving power while a power-intensive overtaking maneuver has been carried out, and is therefore highly relevant for safety. The early determination of the peak power profile and the available drive power, in particular of the available maximum drive power, makes it possible to ensure safe driving to the driver and the occupants of the vehicle even for a power-intensive driving maneuver.

The drive power or maximum drive power advantageously comprises at least the electrical power or maximum electrical power of the energy store and the power or maximum power of the electric motor. In addition, the drive power or maximum drive power can additionally comprise the power or maximum power of an inverter of the electric drive system.

According to the first aspect of the present invention, the available drive power of the subject vehicle is determined after the determination of the peak power profile. The available maximum drive power (peak power) of the subject vehicle is preferably determined. In other words a (power) prediction is carried out which determines which maximum drive power is available for a defined time period; in this context the defined time period can be equal to the predicted time period for the power-intensive driving maneuver.

The determination of the available drive power or of the maximum drive power is advantageously carried out by executing at least one of the following actions:

determining the state of charge of the energy store;
determining the thermal state of the energy store;
determining the power consumption history over a specific time period; and
determining an operating limit of the electric motor.

In other words, a prediction of the available drive power or available maximum drive power is carried out during which the available power or available maximum power, optionally also the operating limit, of the electric drive system, that is to say at least of the electric motor and the energy store, are taken into account. The available electrical power of the energy store is determined, for example, by considering the current state of charge of the energy store, the thermal state of the individual energy storage modules, e.g. cell temperatures and module temperatures, as well as the history of the power consumption over a defined time period.

The determination of available drive power advantageously comprises the determination of the available drive power for the full execution of the predicted driving maneuver and the determination of the available drive power after full execution of the predicted driving maneuver.

In other words, both a prediction of the available drive power and the maximum drive power for the duration which is required for the full execution of the predicted driving maneuver is carried out and a following prediction of the available drive power or of the maximum drive power for the time period after full execution of the predicted driving maneuver. That is to say that there is determination of which power capacity of the electric drive system is still available if the drive power which is required for the full execution of the predicted driving maneuver has been called.

The drive power which is required for the predicted driving maneuver or the maximum drive power and optionally the history of the power consumption over a preceding defined time period and/or the current operating state of the electric drive system is used for the determination of the available drive power or of the available maximum drive power after full execution of the predicted driving maneuver.

According to the first aspect of the present invention, it is then evaluated whether the available drive power or available maximum drive power is sufficient for the peak power profile. For this, the available drive power which is determined by the prediction or by the prediction and the following prediction or the available maximum drive power is compared with the determined time profile of the drive power over the predicted duration. The energy criterion is satisfied if the available drive power is sufficient for the peak power profile.

An equivalent value for the duration of the predicted driving maneuver and/or the level of the available drive power or the available maximum drive power and/or for the time profile of the drive power or of the available maximum drive power is advantageously determined if the duration of the predicted driving maneuver and/or the time profile of the drive power over the predicted duration cannot be determined.

According to the first aspect of the present invention, the determination of the satisfaction of the traffic criterion comprises detecting a traffic situation in the surroundings of the subject vehicle. A traffic situation in the surroundings of the subject vehicle is to be understood as being a situation around the subject vehicle and the section of route lying directly in front of, next to and behind the subject vehicle. The surroundings of the subject vehicle also comprise, for example, one or more lanes next to the subject vehicle. A traffic situation is to be understood as all the external factors which relate to the travel, in particular the predicted driving maneuver, of the subject vehicle. The external factors include, for example, the traffic condition, the route topology, the weather condition, the street condition, speed limits, alerts relating to disruptions and/or accidents of other road users, etc. The traffic situation comprises at least the traffic condition and the route topology in the surroundings of the subject vehicle. The traffic condition is to be understood as the current status with respect to the traffic density and traffic impediments and relates at least to the oncoming traffic, vehicles travelling ahead and pulling out vehicles. The traffic condition describes, for example, slowly moving traffic, speed limits, an accident or a traffic jam. The route topology is to be understood as the course of the route and the route profile with respect to the condition of the route and with respect to deviations from the straight horizontal distance and comprises, for example, the positions of bends, corrugations, differences in height, vertical bends, localities, roundabouts, turnings, entry roads and exit roads, gradients etc. along a route.

The route is to be understood as at least the section of the route of the predicted driving maneuver and the section of the route lying ahead of it, that is to say the section of the route lying ahead of the subject vehicle in the direction of travel. Detection of the traffic situation can be carried out by detecting surroundings data which are determined, for example, by means of a surroundings detection device. The surroundings detection device is designed to detect the surroundings of the vehicle with the aid of a surroundings sensor system and to make available and/or process corresponding surroundings data. The surroundings sensor system comprises at least one of the following devices: ultrasonic sensor, radar sensor, lidar sensor and/or camera. The surroundings data can originate from one of the abovementioned devices or from a combination of a plurality of the abovementioned devices (sensor data fusion). The detection of the traffic situation can also be carried out by means of data from a map which contains information about the traffic situation. The map data can originate, for example, from navigation data. The map data is present here, for example, on a server which the subject vehicle can access, or on a memory unit in the subject vehicle. The detection of the traffic situation can also be carried out by means of a vehicle-to-vehicle communication, wherein information about the traffic situation is then transmitted from a vehicle to the subject vehicle. If the driving maneuver is an overtaking operation, the detection of the traffic situation can comprise the sending of an overtaking operation of a vehicle travelling ahead.

The evaluation as to whether the predicted driving maneuver can be fully executed in relation to the detected traffic situation is carried out in the control unit of the subject vehicle. In this context, different parameters which relate to the traffic situation are evaluated by comparing them with specific minimum values or setpoint valves. Such parameters comprise, for example, the distance of the subject vehicle from the other road users who are located in the surroundings of the subject vehicle, the differential speed with respect to the other road users and/or the differential acceleration with respect to the other road users. The evaluated parameters lie within the defined minimum value limits or setpoint value limits, the predicted driving maneuver can be fully executed in relation to the detected traffic situation, and therefore the traffic criterion is satisfied. If the evaluated parameters lie outside the defined minimum value limits or setpoint value limits, the predicted driving maneuver cannot be fully executed in relation to the detected traffic situation and therefore the traffic criterion is not satisfied.

The driving maneuver criteria can also comprise an efficiency criterion. The efficiency criterion serves as a decision aid as to whether the predicted power-intensive driving maneuver is to be considered appropriate with respect to the travelling efficiency.

According to an embodiment, the time saved by the full execution of the predicted driving maneuver is calculated for the determination of the satisfaction of the efficiency criterion. The time saved is calculated, for example, by at least partially using the data which are determined and/or evaluated for the prediction of the power-intensive driving maneuver and the determination of the energy criterion as well as of the traffic criterion to determine how much time is saved when the power-intensive driving maneuver is carried out in comparison to when the power-intensive driving maneuver is not carried out. The consideration of the traffic condition in the surroundings of the subject vehicle is also included in the calculation of the saved time. If it is detected, for example, that a traffic jam, slowly moving traffic, a speed limit or an obstacle is present just before the overtaking operation, the time saved is correspondingly reduced.

Furthermore, for the determination of the satisfaction of the efficiency criterion the drive power which is additionally consumed by the full execution of the predicted driving maneuver is calculated. The additionally consumed drive power is calculated, for example, by at least partially using the data which are determined and/or evaluated for the prediction of the power-intensive driving maneuver and the determination of the energy criterion as well as of the traffic criterion to determine how much drive power is additionally consumed when the power-intensive driving maneuver is carried out in comparison with when the power-intensive driving maneuver is not carried out.

For the determination of the satisfaction of the efficiency criterion it is finally evaluated whether the quotient of the time saved and of the additionally consumed drive power lies within a predefined value range, wherein the efficiency criterion is satisfied if the quotient is within the predefined value range.

The displaying of the result of the determination can comprise a display as to whether the determined driving maneuver criteria are satisfied or not. Alternatively, the displaying of the result of the determination can comprise the displaying of each individual result of the respective determination of the satisfaction of the respective criterion. In this case, for example the result of the determination of the satisfaction of the energy criterion and the result of the determination of the satisfaction of the traffic criterion are displayed individually.

According to a further embodiment, the result of the determination is displayed only for a predefined time period, wherein the predefined time period depends on at least one of the following factors: current speed of the subject vehicle, change in the traffic situation, change in the available drive power, change in the time saved and change in the additionally consumed drive power.

According to a further embodiment, the displaying of the result of the determination comprises the displaying of a recommendation for the predicted driving maneuver if the energy criterion and the traffic criterion are satisfied, and the displaying of a recommendation against the predicted driving maneuver if the energy criterion/other traffic criterion are not satisfied. In other words, the predicted driving maneuver is advised against if the energy criterion or the traffic criterion is not satisfied, or both the energy criterion and the traffic criterion are not satisfied. For the displaying of a recommendation for the predicted driving maneuver, the efficiency criterion does not have to be satisfied. Although an efficiency criterion which is not satisfied can entail unnecessary consumption of drive power, it does not constitute a safety risk for the subject vehicle or the vehicle occupants.

The displaying of the result of the determination as to whether the driving maneuver criteria for the predicted driving maneuver are satisfied is advantageously executed by a display device. The display device comprises an acoustic indicator and/or a visual display and/or a haptic indicator. The recommendation to execute the predicted driving maneuver is expressed, for example, by the lighting up or flashing in a specific color, for example in green or yellow color.

The display device preferably comprises a visual display in the form of a display unit. The displaying of the result of the determination, in particular of the recommendation to execute or not to execute the predicted driving maneuver is then carried out, for example, by displaying a message on the display unit.

The displaying of the result of the determination advantageously comprises displaying a predicted time profile of the drive power. For example, on the basis of the determination of the available drive power the speed starting from which a drop in the drive power has to be expected is displayed on a speed display (e.g. tachometer), and/or the rotational speed starting from which a drop in the drive power has to be expected is displayed on a display of the rotational speed. Instead of the drive power, it is also possible to use the (available) maximum drive power as the relevant variable. The focus would then be on the application of a brief peak load and not on the configuration of the permanent load. The display or indicator can be visual, haptic and/or acoustic.

The displaying of the result of the determination also advantageously comprises displaying the predicted duration of the predicted driving maneuver. The display or indicator can be visual, haptic and/or acoustic.

A number of steps of the driving assistance system described above are advantageously carried out again during the execution of power-intensive driving maneuver. As a result, individual steps of the driving assistance method can be changed in the course of the execution of the power-intensive driving maneuver. During the power-intensive driving maneuver it is advantageously continuously determined whether the driving maneuver criteria are satisfied. That is to say therefore that the steps described above for determining the satisfaction of the individual driving maneuver criteria are carried out at predefined time intervals during the execution of the power-intensive driving maneuver. If the result of the determination of the satisfaction of the driving maneuver criteria should change within the course of the power-intensive driving maneuver the displaying of the result of the determination also changes.

According to one embodiment, it can be the case, for example during the execution of the power-intensive driving maneuver, that a recommendation for the execution of the predicted driving maneuver which is originally displayed is updated by a recommendation against the execution of the predicted driving maneuver. In other words, an abort request of the power-intensive driving maneuver is displayed.

If the display of the result of the determination is changed in the course of the power-intensive driving maneuver, an abort request can be additionally displayed. The display of the abort request can comprise additional elements such as, for example, a display for providing assistance during the feeding back into the original lane. In addition, the abort request can be displayed for a limited time. The time limitation is indicated visually here, for example, by a time bar which becomes smaller.

The driving assistance method which is described above for assisting a power-intensive driving maneuver of a subject vehicle can be part of an automated driving maneuver. The term "automated driving" or "automated driving maneuver" can be understood within the scope of the document to be driving with automated longitudinal or transverse guidance or autonomous driving with automated longitudinal and transverse guidance. The term "automated driving" comprises automated driving with any desired degree of automation. Exemplary degrees of automation are assisted, partially automated, highly automated or fully automated driving. These degrees of automation are defined by the Bundesanstalt für Straßenwesen (BASt) [German Federal Highway Research Agency], (see BASt publication "Forschung kompakt [Research compact]", issue November 2012). During assisted driving, the driver continuously executes the longitudinal or transverse guidance while the system performs the respective other function within certain limits. In the case of partially automated driving (TAF), the system performs the longitudinal and transverse guidance for a certain time period and/or in specific situations, wherein the driver has to continuously monitor the system as in the case of assisted driving. In the case of highly automated driving (HAF), the system performs the longitudinal and transverse guidance for a certain time period without the driving having to continuously monitor the system; but the driver must be able to take over the guidance of the vehicle within a certain time. In the case of fully automated driving (VAF), the system can automatically control the driving in all situations for a specific application; in this application there is no longer a need for a driver. The four degrees of automation specified above according to the definition of the BASt correspond to the SAE levels 1 to 4 of the Standard SAE J3016 (SAE—Society of Automotive Engineering). For example, highly automated driving (HAF) according to the BASt corresponds to level 3 of the Standard SAE J3016. In addition, in SAE J3016, the SAE level 5 is also provided as the highest degree of automation which is not included in the definition of the BASt. The SAE level 5 corresponds to driverless driving in which the system can automatically control all the situations like a human driver during the entire journey; a driver is generally no longer required.

If the driving assistance method which is described above is part of an automated driving maneuver, the driving assistance method serves mainly to provide the vehicle occupants of the subject vehicle with feedback about the driving operations which are running automatically. However, the driving assistance method can also be used to provide the driver of the subject vehicle with the possibility of controlling the selection of a specific power-intensive driving maneuver or of actively intervening in the execution of the power-intensive driving maneuver on the basis of the information which is displayed to him.

A second aspect of the invention relates to a driving assistance system for a power-intensive driving maneuver of a subject vehicle which is powered by an electric motor fed by an energy store, wherein the driving assistance system has:

a detection unit which has a prediction detection unit for predicting a power-intensive driving maneuver of the subject vehicle and a traffic situation-detection unit for detecting a traffic situation in the surroundings of the subject vehicle;

a control unit which is coupled to the detection unit and the energy store; and a display device which is coupled to the control unit;

wherein the control unit is designed to determine whether driving maneuver criteria which comprise at least one energy criterion and one traffic criterion are satisfied for the predicted driving maneuver;

wherein the determination of the satisfaction of the energy criterion comprises:

determining a peak power profile which is required for the full execution of the predicted driving maneuver;

determining the available drive power of the subject vehicle;

evaluating whether the available drive power is sufficient for the peak power profile, wherein the energy criterion is satisfied if the available drive power is sufficient for the peak power profile;

wherein the determination of the satisfaction of the traffic criterion comprises:

detecting a traffic situation, which comprises at least one traffic condition and/or one route topology, in the surroundings of the subject vehicle;

evaluating whether the predicted driving maneuver can be fully executed in relation to the detected traffic situation, wherein the traffic criterion is satisfied if the predicted driving maneuver can be fully executed in relation to the detected traffic situation;

and wherein the display device is designed to display the result of the determination.

A driving assistance system according to the present document refers, in particular, to an electronic device which can carry out, in an at least partially automated or autonomous fashion, an intervention in a vehicle guidance, for example in a longitudinal guidance of the vehicle and/or a transverse guidance of the vehicle. For the definition of the term automated or autonomous intervention in a vehicle guidance, reference is made to the terms defined above of "automated driving" or of "an automated driving maneuver", which can be applied in parallel to the driver assistance system.

According to one embodiment of the driving assistance system the driving maneuver criteria also comprise an efficiency criterion, wherein the determination of the satisfaction of the efficiency criterion comprises:

calculating the time saved by the full execution of the predicted driving maneuver;

calculating the drive power additionally consumed by the full execution of the predicted driving maneuver;

evaluating whether the quotient of the time saved and additionally consumed drive power lies within a predefined value range, wherein the efficiency criterion is satisfied if the quotient lies within the predefined value range.

The determination of the satisfaction of the efficiency criterion is advantageously carried out by the control unit.

According to a further embodiment of the driving assistance system, the display device is also designed to display the result of the determination only for a predefined time period, wherein the predefined time period depends at least on one of the following factors: current speed of the subject vehicle, change in the traffic situation, change in the available drive power, change in the time saved and change in the additionally consumed drive power.

According to a further embodiment of the driving assistance system, the displaying of the result of the determination comprises:

a) displaying a recommendation for the predicted driving maneuver if the energy criterion and the traffic criterion are satisfied; and b) displaying a recommendation against the predicted driving maneuver if the energy criterion and/or the traffic criterion are satisfied.

A third aspect of the invention relates to a vehicle having a driver assistance system according to one of the embodiments described above.

The statements above relating to the inventive driving assistance method according to the first aspect of the invention apply correspondingly also to the inventive driving assistance system according to the second aspect of the invention; advantageous exemplary embodiments of the inventive driving assistance system correspond to the advantageous exemplary embodiments of the inventive driving assistance method which are described. At this point, advantageous exemplary embodiments of the inventive driving assistance system which are not explicitly described correspond to the advantageous exemplary embodiments of the inventive driving assistance method which are described.

For the assessment of the safety of a planned power-intensive driving maneuver, the described driving assistance method or the driving assistance system provides the driver with a suitable interface for ensuring that the planned power-intensive driving maneuver can be carried out safely without a decrease in the (maximum) drive power being expected.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
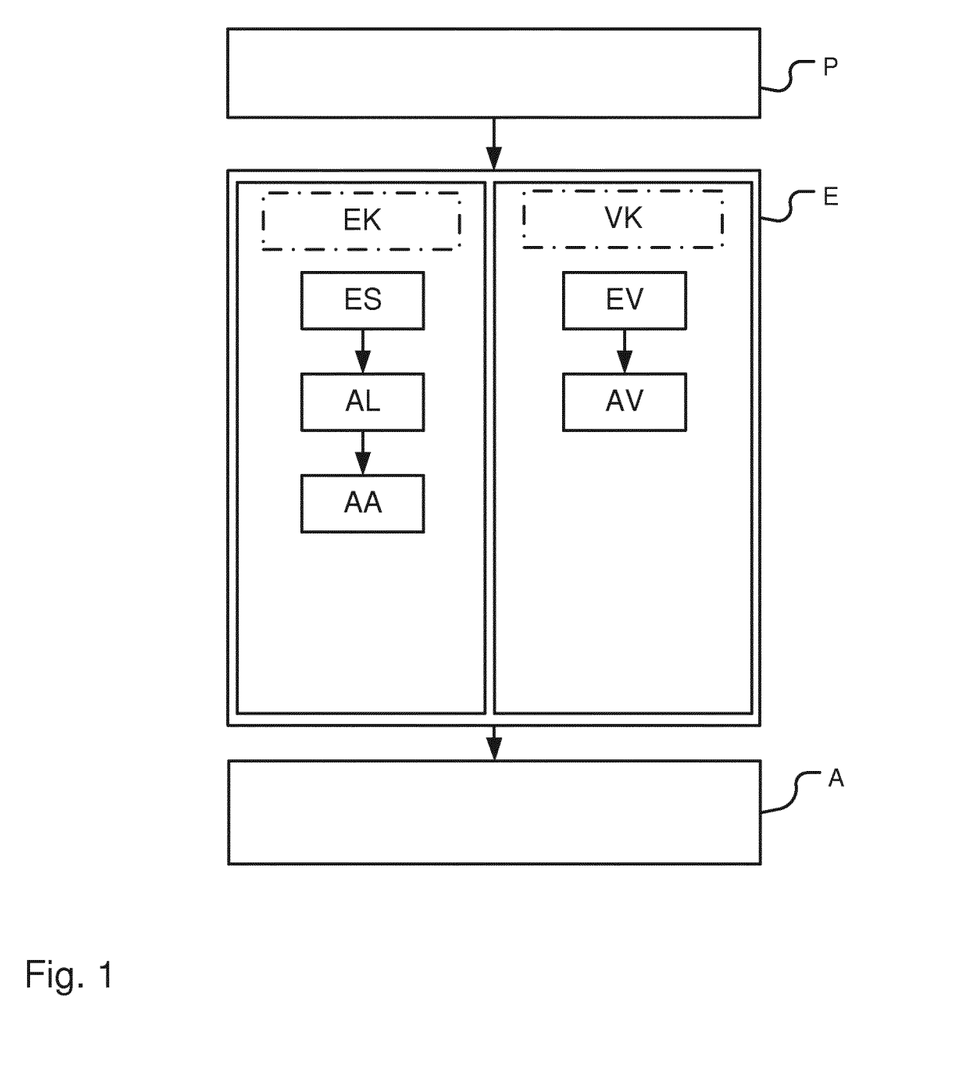
FIG. 1 shows a schematic view of a driving assistance method for assisting a power-intensive driving maneuver.

FIG. 1 shows the profile of a driving assistance method according to the invention for assisting a power-intensive driving maneuver using the example of an overtaking operation of a subject vehicle which is powered by an electric motor fed by an energy store.

In the first step, denoted by P, an overtaking operation of the subject vehicle 1 is predicted, for example, by reducing the distance from the vehicle travelling ahead and simultaneously accelerating the subject vehicle.

In the second step, denoted by E, it is determined whether the driving maneuver criteria, specifically the energy criterion EK and the traffic criterion VK, are satisfied for the predicted overtaking operation.

For the energy criterion EK, firstly a peak power profile is determined which is required for the full execution of the predicted overtaking maneuver. The peak power profile corresponds to the time profile of the required maximum drive power. For this purpose, firstly trajectory planning for the overtaking operation is carried out using the acquired surroundings data, in order to determine the duration for the full execution of the overtaking operation therefrom. Then, the times of the predicted overtaking operation at which the maximum drive power has to be available and the times at which the predicted overtaking operation can make available less drive power are determined. In other words, it is calculated when and for how long the electric drive system has to be operated during the overtaking operation under the peak load or under the permanent load in order to execute the overtaking operation fully. This step is denoted by ES in FIG. 1. After the calculation of the available drive power, denoted by AL in FIG. 1, it is evaluated whether the available drive power is sufficient for the peak power profile; this step is denoted in FIG. 1 by AA. The available drive power is determined, in particular, by virtue of the fact that the state of charge of the (high voltage) battery (of the energy store) is determined. The peak power profile relates, in particular, to the time profile of the required charge quantity of the battery. If it is detected during the evaluation that the available drive power, that is to say in particular the state of charge of the battery, is sufficient for the peak power profile, that is to say in particular for the time profile of the required charge quantity of the battery, the energy criterion EK is satisfied.

For the traffic criterion, firstly a traffic situation is detected; this step is denoted by EV. The traffic situation is detected with a surrounding sensor system which is installed in or on the subject vehicle and is detected using map data which are continuously updated and stored in the backend. In other words, it is detected how the traffic density on the lane/lanes in the surroundings of the subject vehicle and the route profile of the route lying ahead of the subject vehicle are. In a subsequent step, denoted by AV, it is evaluated whether the predicted overtaking operation can be fully and safely executed on the basis of the detected traffic density and the detected route profile. If, for example, it were known by means of the surrounding sensor system and/or the map data that an entry lane, a sharp bend, a bend combination with poor visibility, a vertical bend and/or an obstacle lie on the section of route lying ahead, this could lead to a situation in the predicted overtaking operation being categorized as unsafe and therefore as not fully executable. If the predicted overtaking operation cannot be executed fully in relation to the detected traffic situation, the traffic criterion VK is not satisfied. In the last step, which is denoted by A, the result of the determination is displayed. Examples of such a display are represented in FIGS. 3-8.

Figure 2:
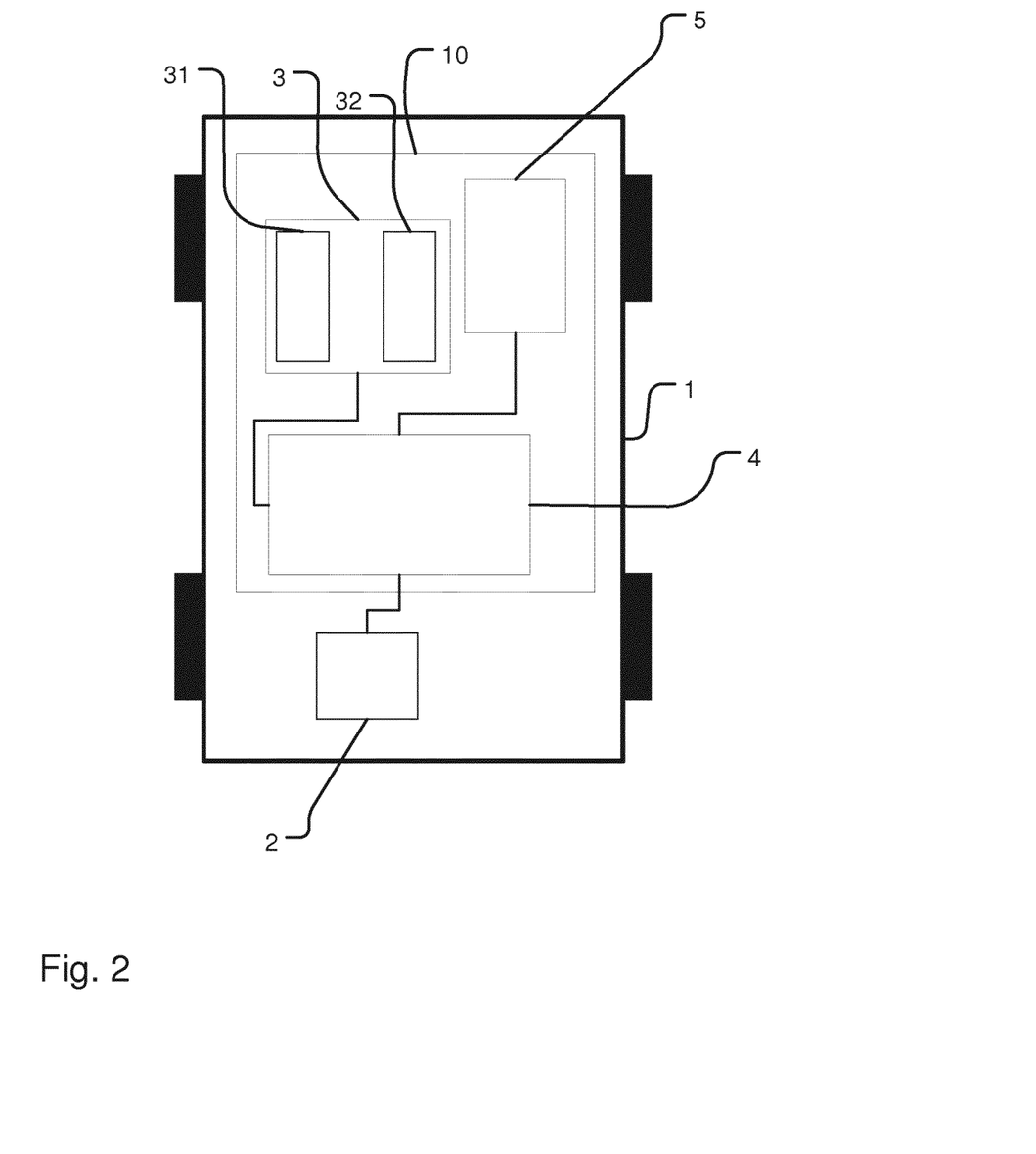
FIG. 2 shows a schematic view of an assistance system for a power-intensive driving maneuver.

FIG. 2 shows a schematic view of a driving assistance system for a power-intensive driving maneuver which is explained using the example of an overtaking operation. FIG. 2 shows the driving assistance system 10 as part of a subject vehicle 1, wherein the subject vehicle is not a component of the driving assistance system. The subject vehicle 1 has an energy store 2, e.g. a (high-voltage) battery and an electric motor (not depicted) which is fed thereby. The electric motor powers the subject vehicle 1.

The driving assistance system 10 has a detection unit 3. The detection unit 3 has a prediction detection unit 31 for predicting a power-intensive driving maneuver of the subject vehicle 1 and a traffic situation-detection unit 32 for detecting a traffic situation in the surroundings of the subject vehicle 1. The prediction detection unit 31 is designed to detect, evaluate and make available surroundings data, pedal parameters and steering parameters of the subject vehicle 1. If it is detected the prediction detection unit 31 that, for example, the accelerator pedal of the subject vehicle 1 is suddenly depressed within a predetermined time, i.e. that the entire pedal travel is used up in a very short time and if at the same time it is detected by means of the surroundings data that the distance from the vehicle travelling ahead is reduced, the prediction detection unit 31 thus predicts an overtaking operation. The traffic situation-detection unit 32 is designed to detect, evaluate and make available data relating to the traffic condition in the surroundings of the subject vehicle 1 and/or a route topology in the surroundings of the subject vehicle 1. If the subject vehicle 1 is located, for example, on a two-lane road, the traffic situation-detection unit 32 can detect oncoming traffic on the oncoming lane or from the oncoming lane or traffic which is pulling out onto the oncoming lane.

The driving assistance system 10 also has a control unit 4 which is coupled to the detection unit 3 and the energy store 2. If an overtaking operation is predicted by the detection unit 3 and a traffic situation is detected, corresponding information is passed on to the control unit 4. The control unit 4 subsequently determines whether the driving maneuver criteria, such as, for example, described above, are satisfied for the predicted driving maneuver. For example, the control unit 4 determines, for the determination of the satisfaction of the energy criterion EK, a peak power profile which is required for the full execution of the overtaking operation. Furthermore, the control unit 4 determines the available drive power of the subject vehicle 1 and determines whether the available drive is sufficient for the previously determined peak power profile. In other words, the control unit 4 checks whether the available drive power is sufficient to operate the electric drive system under peak load or continuous load for the respective determined time periods.

In addition, the driving assistance system 10 has an instrument display 5 which is designed to display the result of the determination. Moreover, the instrument display 5 is designed to display a wide variety of information such as, for example, the speed, rotational speed, level of the gasoline, gear, engine oil temperature, speed limit info, navigation instructions, communication data and/or the current fuel consumption. In this context, the display can occur visually, acoustically and/or haptically. The instrument display 5 can have one or more displays for this. The term display includes, for example, a headup display, a holographic display, an instrument panel or a conventional display.

If it is detected, for example, that the energy criterion EK and the traffic criterion VK are satisfied, the control unit 4 transfers this information to the instrument display 5.

Various examples of the display of the result of the determination as to whether the driving maneuver criteria are satisfied for the predicted overtaking operation are shown in FIGS. 3 to 8. The driving maneuver criteria comprise here the energy criterion, the traffic criterion and an efficiency criterion. The time saved for the predicted overtaking operation and the drive power which is additionally consumed by the full execution of the predicted overtaking operation are calculated for the determination of the efficiency criterion. Finally, it is evaluated whether the quotient of the time saved and the additionally consumed drive power lies within a predefined value range. The value range is already predefined or can be determined by the driver himself. The efficiency criterion is satisfied if the quotient lies within the predefined value range.

FIGS. 3 to 7 show examples of a display of the determination of the satisfaction of the driving maneuver criteria in the form of an assistance menu 50. This assistance menu 50 is activated as soon as a power-intensive driving maneuver is predicted. In the text which follows this will be explained with reference to an overtaking operation. However, the statements which are made apply not only to an overtaking operation but also to any power-intensive driving maneuver. Therefore, if an overtaking operation is predicted, for example, by the evaluation of the surroundings data, of the pedal parameters and/or of the steering data, the assistance menu 50 is displayed in the headup display which is part of the instrument display 5. The assistance menu 50 assists the driver in the assessment of the driving maneuver criteria which assist him in his decision for or against the overtaking operation.

Figure 3:
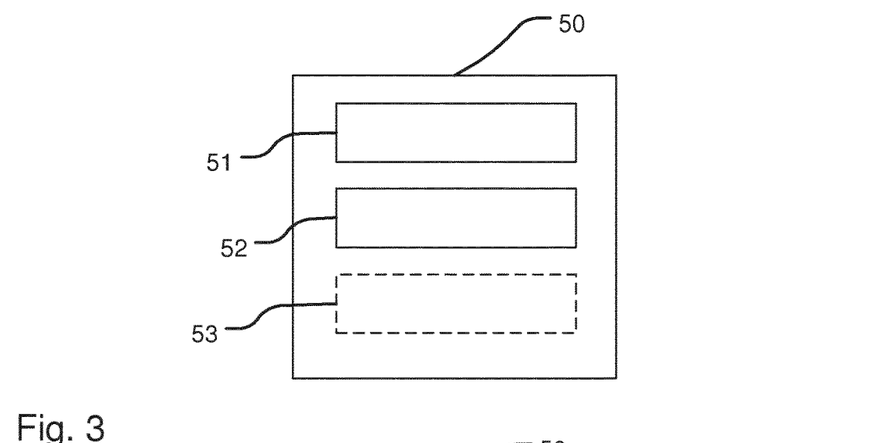
FIGS. 3 to 8 show by way of example a display of the result of the determination of the satisfaction of driving maneuver criteria.

FIG. 3 shows an assistance menu 50 which has an energy criterion display 51, a traffic criterion display 52 and an efficiency criterion display 53. As soon as one of the criteria is satisfied, this is represented by a colored surrounding/background (for example by a green edge), by flashes or changes in brightness/contrast of the respective criterion display. In FIG. 3, the satisfaction of the energy criterion and of the traffic criterion is illustrated with continuous lines of the energy criterion display 51 and of the traffic criterion display 52. The dashed line of the efficiency criterion display 53 corresponds to the non-satisfaction of the efficiency criterion. With this configuration with the assistance menu 50 it is displayed to the driver that the energy criterion and the traffic criterion are satisfied, but the efficiency criterion is not satisfied, for the predicted overtaking operation. Since the efficiency criterion is not safety-relevant, with this configuration a recommendation for the predicted overtaking operation is displayed to the driver. This can be done, for example, by the assistance menu 50 lighting up or flashing in a green color. Alternatively, a corresponding information can be included in a display, or a corresponding voice message can be played.

Figure 4:
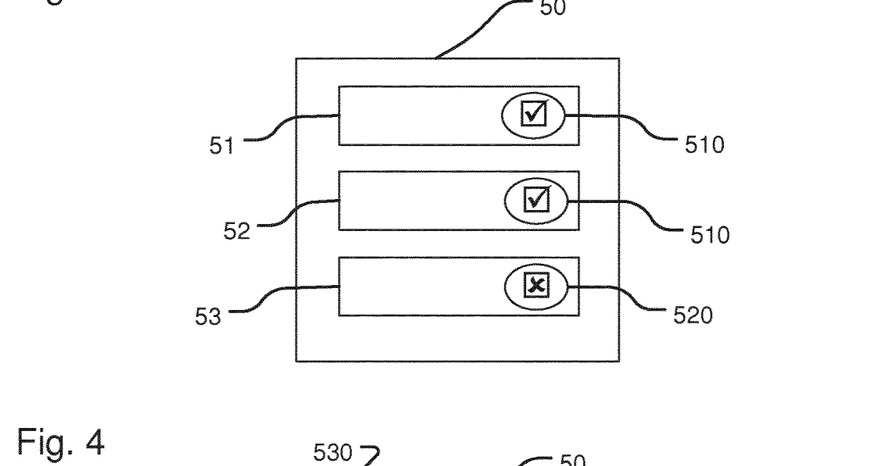

FIG. 4 shows an assistance menu 50 which is similar to the assistance menu 50 shown in FIG. 3. The difference is the representation of the satisfaction of a driving maneuver criterion. The assistance menu 50 is, as also in the example shown in FIG. 3, divided into the energy criterion display 51, the traffic criterion display 52 and the efficiency criterion display 53. A symbol 510 and 520, which is assigned to the driving maneuver criterion 51, 52 and 53, represents whether a specific driving maneuver criterion 51, 52 and 53 is satisfied or not. The symbol 510, which comprises, for example, a hook, stands for satisfaction of the respective driving maneuver criterion 51, 52 and 53; and the symbol 520 which comprises, for example a cross, stands for the non-satisfaction of the respective driving criterion 51, 52 and 53.

Figure 5:
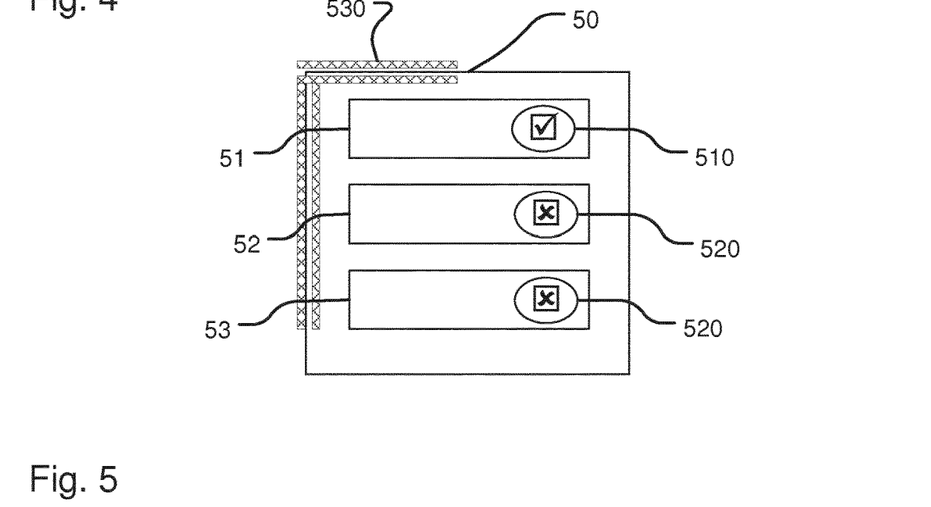

FIG. 5 shows a further configuration of an assistance menu 50. In this configuration, the energy criterion display 51 is assigned the symbol 510, and the traffic criterion display 52 and the efficiency criterion display 53 are assigned the symbol 520. In other words, it is represented to the driver that the energy criterion is satisfied, while the traffic criterion and the efficiency criterion are not satisfied. In addition, in this configuration of the assistance menu 50 it is clarified, by means of colored (for example red) highlighting 530 along the edge of the assistance menu 50 that there is no recommendation for the predicted overtaking operation. A recommendation for the predicted overtaking operation would be displayed only when at least the energy criterion and the traffic criterion are satisfied.

Figure 6:
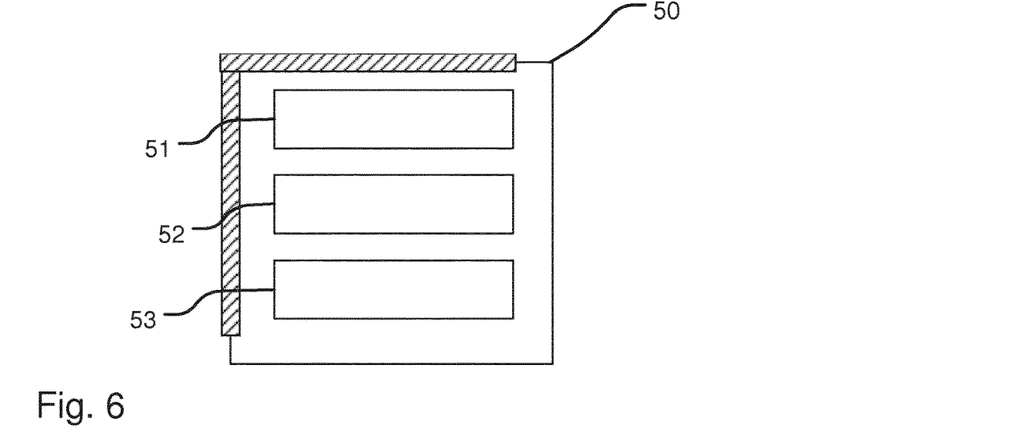
Figure 7:
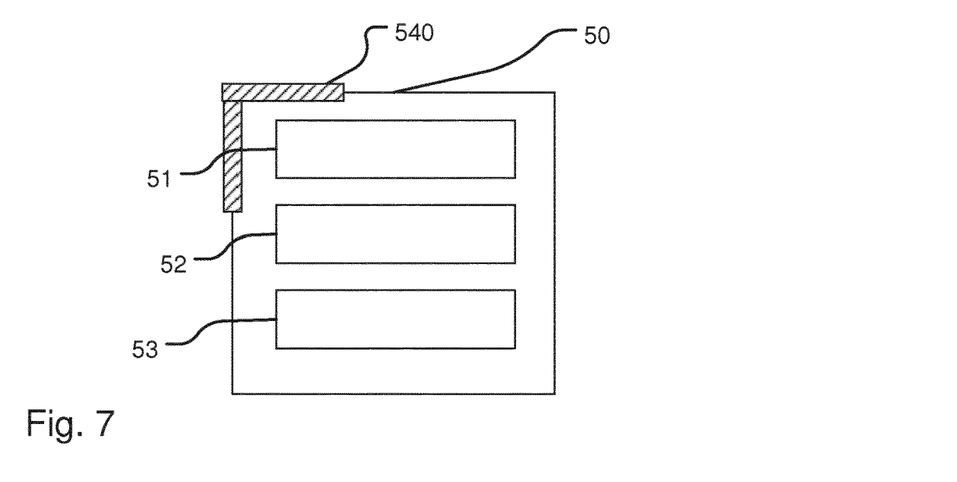

FIGS. 6 and 7 show a further example of a configuration of an assistance menu 50. The visual representation or the arrangement of the individual driving maneuver criteria 51, 52 and 53 within the assistance menu 50 can be configured as illustrated in FIGS. 3-5. The assistance menu 50 in FIGS. 6 and 7 is assigned, similarly to as shown in FIG. 5, a colored (for example green) highlighting 540 along the edge of the assistance menu 50. The colored highlighting 540 clarifies the recommendation for the predicted overtaking operation (for example by the color green) or against the predicted overtaking operation (for example by the color red). In addition, in FIGS. 6 and 7 a time restriction of the recommendation is illustrated in that the colored highlighting 540 along the edge of the assistance menu 50 becomes shorter in the course of time. FIG. 6 therefore precedes FIG. 7 in terms of timing. In other words, the time restriction of the recommendation represents that the predicted overtaking operation is assessed as being safely executed only for a specific time period. As soon as boundary conditions, such as for example the traffic condition, the route topology or the available drive power, change, the time restriction for the recommendation is also changed.

Figure 8:
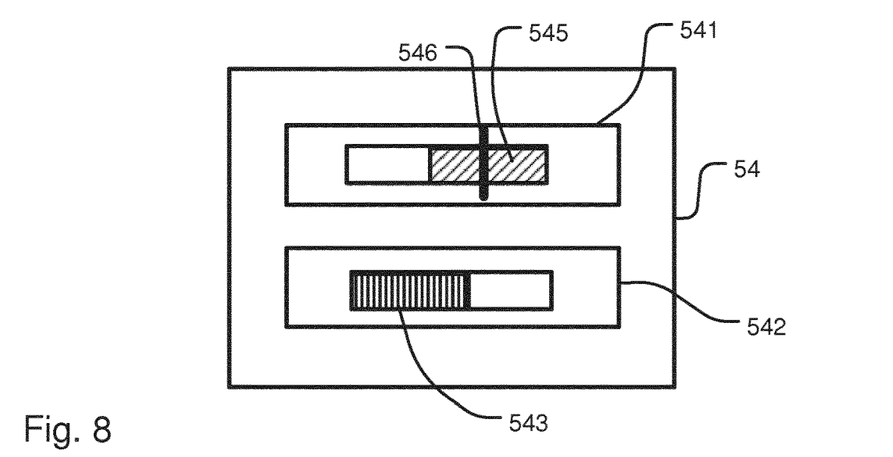

FIG. 8 shows an example of an expanded display function 54 of one of the forms described above for a display of the result of the determination of the driving maneuver criteria. This expanded display function 54 can preferably be integrated into one of the presented illustrations of the assistance menu 50. During the execution of the predicted driving maneuver, e.g. during the execution of the overtaking operation, the expanded display function 54 provides information as to how much drive power is necessary for safe execution of the predicted driving maneuver. The level of the drive power during the predicted driving maneuver can be determined by changing the pedal travel, that is to say by weak or strong depression of the accelerator pedal. The expanded display function 54 displays an additional recommendation which, for example, provides the driver of the vehicle with feedback as to whether he has depressed the accelerator pedal sufficiently strongly and/or whether he can safely execute the predicted driving maneuver with an accelerator pedal which is depressed to a lesser extent (and therefore with lower consumption of drive power).

For this, the expanded display function 54 shown in FIG. 8 has a pedal parameter display 541 and an overtaking duration display 542. The pedal parameter display 541 comprises a pedal travel range display 545, which indicates a range of the pedal travel in which execution of the predicted overtaking operation is possible, and a pedal travel indicator 546 which indicates the current pedal travel. This means therefore that the pedal parameter display 541 provides information whether it is possible or necessary to accelerate to a greater or lesser extent in order to execute the predicted overtaking operation. In addition, the pedal parameter display 541 provides information as to whether the current pedal travel, i.e. that is to say the current acceleration, is in a range in which execution of the predicted overtaking operation is safely possible. It is, for example, signaled to the driver that he is overtaking with minimum consumption of drive power as long as the pedal travel indicator 546 remains at the lower threshold of the pedal travel range display 545 (hatched area in FIG. 8).

The overtaking duration display 542 represents the anticipated duration of the overtaking operation, which duration is predicted on the basis of the predicted driving maneuver. For this, the overtaking display 542 has a time bar 543 which indicates the predicted still remaining duration of the overtaking operation.

By means of this example of an expanded display function 54, the driver is assisted in calling only so much drive power as is required for the predicted overtaking operation. If the driver were to call more drive power than is necessary or possible, the pedal parameter display 541 and the overtaking duration display 542 would thus correspondingly change.

Alternatively or additionally to the pedal parameter display 541 shown in FIG. 8, a bar can appear on the speed display (tachometer) of the subject vehicle as soon as the assistance menu 50 is displayed. This bar runs along a certain speed range which indicates visually to the driver the speed up to which the (maximum) drive power is available.

An objective of the illustrated examples of an assistance menu 50 is to make it possible to track and predict the available drive power and a possible following decrease in the drive power.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A driving assistance method for assisting a power-intensive driving maneuver of a subject vehicle which is powered by an electric motor fed by an energy store, wherein the driving assistance method comprises:
    predicting the power-intensive driving maneuver of the subject vehicle;
    determining whether driving maneuver criteria, which comprise at least one energy criterion and at least one traffic criterion, are satisfied for the predicted power-intensive driving maneuver, wherein determining whether the at least one energy criterion is satisfied comprises:
        determining a peak power profile required for a full execution of the predicted power-intensive driving maneuver,
        determining an available drive power of the subject vehicle, and
        evaluating whether the available drive power is sufficient for the peak power profile, wherein the at least one energy criterion is satisfied when the available drive power is sufficient for the peak power profile, and
    wherein determining whether the at least one traffic criterion is satisfied comprises:
        detecting a traffic situation, which comprises at least one: a traffic condition and/or a route topology, in the surroundings of the subject vehicle, and
        evaluating whether the predicted power-intensive driving maneuver can be fully executed in the detected traffic situation, wherein the traffic criterion is satisfied when the predicted driving maneuver can be fully executed in detected traffic situation; and
    displaying a result of said determining whether the driving maneuver criteria are satisfied for the predicted power-intensive driving maneuver.

2. The driving assistance method according to claim 1, wherein the driving maneuver criteria also comprise an efficiency criterion, and wherein determining whether the efficiency criterion is satisfied comprises:
    calculating a time saved by the full execution of the predicted power-intensive driving maneuver;
    calculating a drive power which is additionally consumed by the full execution of the predicted power-intensive driving maneuver; and
    evaluating whether a quotient of the time saved and the additionally consumed drive power lies within a predefined value range, wherein the efficiency criterion is satisfied when the quotient lies within the predefined value range.

3. The driving assistance method according to claim 2, wherein the result of said determining whether the driving maneuver criteria are satisfied is displayed only for a predefined time period that is based on at least one of the following: a current speed of the subject vehicle, a change in traffic situation, a change in the available drive power, a change in the time saved, and a change in the drive power that is additionally consumed by the full execution of the predicted power-intensive driving maneuver.

4. The driving assistance method according to claim 1, wherein displaying the result comprises:
    displaying a recommendation in favor of the predicted driving maneuver if the energy criterion and the traffic criterion are satisfied; and
    displaying a recommendation against the predicted driving maneuver if the energy criterion and/or the traffic criterion are not satisfied.

5. The driving assistance method according to claim 2, wherein displaying the result comprises:
    displaying a recommendation in favor of the predicted driving maneuver if the energy criterion and the traffic criterion are satisfied; and
    displaying a recommendation against the predicted driving maneuver if the energy criterion and/or the traffic criterion are not satisfied.

6. The driving assistance method according to claim 3, wherein displaying the result comprises:
    displaying a recommendation in favor of the predicted driving maneuver if the energy criterion and the traffic criterion are satisfied; and
    displaying a recommendation against the predicted driving maneuver if the energy criterion and/or the traffic criterion are not satisfied.

7. A driving assistance system configured to perform a power-intensive driving maneuver of a subject vehicle which is powered by an electric motor fed by an energy store, wherein the driving assistance system comprises:
- a detection unit comprising:
  - a prediction detection unit configured to predict a power-intensive driving maneuver of the subject vehicle, and
  - a traffic situation-detection unit configured to detect a traffic situation in the surroundings of the subject vehicle;
- a control unit coupled to the detection unit and the energy store, wherein the control unit is configured to determine whether driving maneuver criteria, which comprise at least one energy criterion and at least one traffic criterion, are satisfied for the predicted power-intensive driving maneuver, wherein the control unit is configured to determine whether the energy criterion is satisfied by:
  - determining a peak power profile required for a full execution of the predicted power-intensive driving maneuver,
  - determining an available drive power of the subject vehicle, and
  - evaluating whether the available drive power is sufficient for the peak power profile, wherein the energy criterion is satisfied when the available drive power is sufficient for the peak power profile,
- wherein the control unit is configured to determine whether the traffic criterion is satisfied by:
  - detecting a traffic situation, which comprises at least one traffic condition and/or one route topology, in the surroundings of the subject vehicle, and
  - evaluating whether the predicted driving maneuver can be fully executed in the detected traffic situation, wherein the traffic criterion is satisfied when the predicted driving maneuver can be fully executed in the detected traffic situation; and
- a display device coupled to the control unit, wherein the display device is configured to display a result of determining whether the driving maneuver criteria are satisfied for the predicted power-intensive driving maneuver.

8. The driving assistance system according to claim 7, wherein the driving maneuver criteria also comprise an efficiency criterion, and wherein the control unit is configured to determine whether the efficiency criterion is satisfied by:
- calculating a time saved by the full execution of the predicted power-intensive driving maneuver;
- calculating a drive power additionally consumed by the full execution of the predicted power-intensive driving maneuver; and
- evaluating whether a quotient of the time saved and additionally consumed drive power lies within a predefined value range, wherein the efficiency criterion is satisfied if the quotient lies within the predefined value range.

9. The driving assistance system according to claim 8, wherein the display device is configured to display the result of determining whether the driving maneuver criteria are satisfied only for a predefined time period that is based on at least on one of: a current speed of the subject vehicle, a change in traffic situation, a change in the available drive power, a change in the time saved, and a change in the drive power additionally consumed by the full execution of the predicted power-intensive driving maneuver.

10. The driving assistance system according to claim 7, wherein the display device is configured to display the result of determining whether the driving maneuver criteria are satisfied by:
- displaying a recommendation in favor of the predicted driving maneuver if the energy criterion and the traffic criterion are satisfied; and
- displaying a recommendation against the predicted driving maneuver if the energy criterion and/or the traffic criterion are not satisfied.

11. The driving assistance system according to claim 8, wherein the display device is configured to display the result of determining whether the driving maneuver criteria are satisfied by:
- displaying a recommendation in favor of the predicted driving maneuver if the energy criterion and the traffic criterion are satisfied; and
- displaying a recommendation against the predicted driving maneuver if the energy criterion and/or the traffic criterion are not satisfied.

12. The driving assistance system according to claim 9, wherein the display device is configured to display the result of determining whether the driving maneuver criteria are satisfied by:
- displaying a recommendation in favor of the predicted driving maneuver if the energy criterion and the traffic criterion are satisfied; and
- displaying a recommendation against the predicted driving maneuver if the energy criterion and/or the traffic criterion are not satisfied.

13. A vehicle having a driving assistance system configured to perform a power-intensive driving maneuver of a subject vehicle which is powered by an electric motor fed by an energy store, wherein the driving assistance system comprises:
- a detection unit comprising:
  - a prediction detection unit configured to predict a power-intensive driving maneuver of the subject vehicle, and
  - a traffic situation-detection unit configured to detect a traffic situation in the surroundings of the subject vehicle;
- a control unit coupled to the detection unit and the energy store, wherein the control unit is configured to determine whether driving maneuver criteria, which comprise at least one energy criterion and at least one traffic criterion, are satisfied for the predicted power-intensive driving maneuver, wherein the control unit is configured to determine whether the energy criterion is satisfied by:
  - determining a peak power profile required for a full execution of the predicted power-intensive driving maneuver,
  - determining an available drive power of the subject vehicle, and
  - evaluating whether the available drive power is sufficient for the peak power profile, wherein the energy criterion is satisfied when the available drive power is sufficient for the peak power profile,
- wherein the control unit is configured to determine whether the traffic criterion is satisfied by:
  - detecting a traffic situation, which comprises at least one traffic condition and/or one route topology, in the surroundings of the subject vehicle, and evaluating whether the predicted driving maneuver can be fully executed in the detected traffic situation, wherein the traffic criterion is satisfied when the predicted driving maneuver can be fully executed in the detected traffic situation; and a display device coupled to the control unit, wherein the display device is configured to display a result of determining whether the driving maneuver criteria are satisfied for the predicted power-intensive driving maneuver.

* * * * *